Oct. 23, 1962 ANDRÉE PAULETTE EPELBOIN 3,060,113
NEE LEVY ETAL
APPARATUS FOR LIQUID PROCESSING OF STRIP-LIKE MATERIAL
Filed Dec. 2, 1957 2 Sheets-Sheet 1

INVENTORS
ANDRÉE PAULETTE EPELBOIN, nee LEVY.
IZRAËL EPELBOIN.
BY JEAN ALPHONSE SOLE.

Christy, Parmelee & Strickland.

ATTORNEYS.

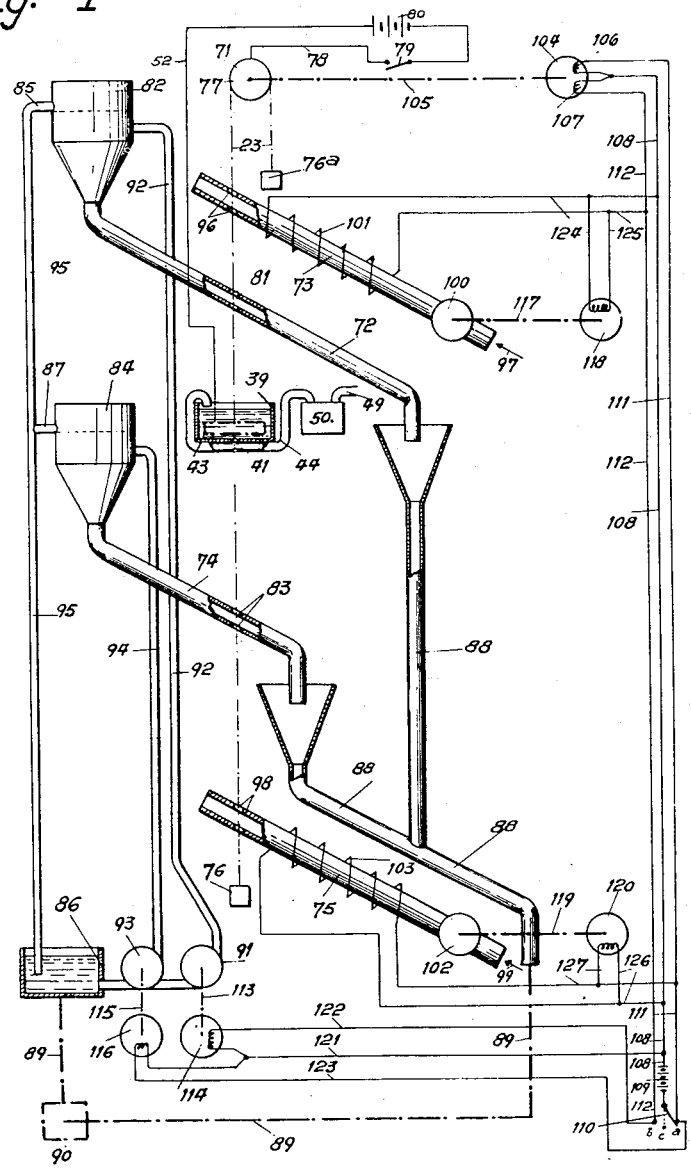

3,060,113
APPARATUS FOR LIQUID PROCESSING OF
STRIP-LIKE MATERIAL
Andrée Paulette Epelboin, née Levy, and Izraël Epelboin, Paris, and Jean Alphonse Sole, Perpignan, France, assignors to Centre National de la Recherche Scientifique, Paris, France
Filed Dec. 2, 1957, Ser. No. 700,164
Claims priority, application France Dec. 3, 1956
4 Claims. (Cl. 204—206)

The invention relates to an apparatus for chemically or electrolytically processing continuous material such as metallic wires or strips.

It has previously been proposed to use a pulley-drive system for moving such a material in a chemical or electrolytic bath. But unless one carefully controls the processing, the action of the liquid on the work-piece may be neither even nor constant, and if corrosive liquids at high temperatures are used, it is very difficult to build an apparatus capable of satisfactorily fulfilling all requirements.

One apparatus according to the invention for processing by means of a processing liquid a piece of elongated material such as a wire or a strip, comprises a processing chamber having at least one end wall pierced with a hole, means for moving said material with clearance through said chamber and said hole, means for bringing the processing liquid into contact with said material at least in the neighborhood of said hole, and suction means for preventing said liquid from being wasted by leaking through said hole.

For electrolytically processing, the apparatus also includes an electrode shaped in conformity with the work-piece and submerged in the processing liquid; the work-piece constitutes the second electrode, and means are provided for connecting both electrodes to a suitable source of current.

The annexed drawings show diagrammatically an example of an embodiment of the invention and a modification thereof.

FIG. 4 is a diagram of a complete installation according to the invention.

For the sake of simplicity, it will be assumed that the processed material consists of a thin metallic wire.

Figure 1:
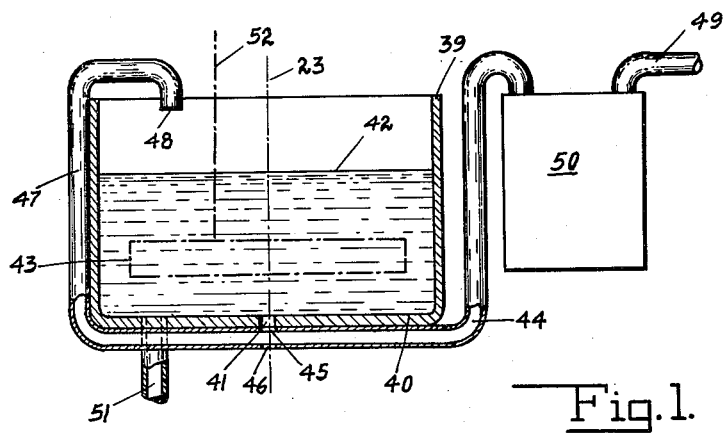
FIG. 1 is a partially sectioned elevation of a first type of processing chamber.
Figure 2:
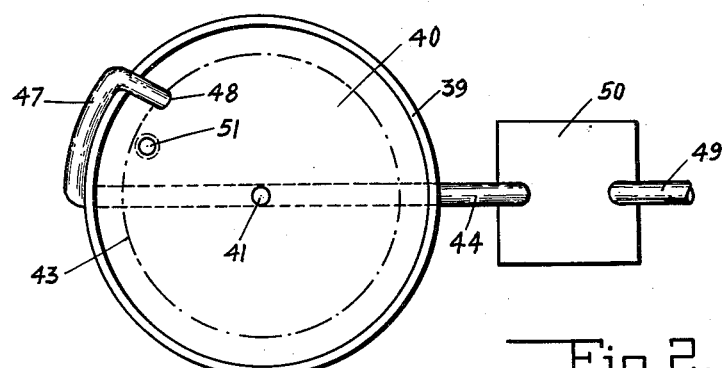
FIG. 2 is a plan view of FIG. 1.

In the embodiment shown in FIGS. 1 and 2, the processing chamber is formed by a cylindrical vessel 39 having a vertical axis and whose bottom 40 is pierced by a central hole 41 for the passage of a wire 23.

According to a first approximation, the immersed length of the wire is defined by the level 42 of the bath. For the electrolytic processings, an electrode 43 is added into the chamber whose sides 39 are in that case made of some insulating material (the electrode 43, takes the form of a winding round the wire).

In order to avoid leakage of the liquid through the hole 41, it is clear that a mild-rubbing seal may be used. This seal however would have to be constantly calibrated to the diameter of the wire, and it would be necessary to take considerable precautions so as not to deteriorate the surface of the wire being processed.

In the present invention these difficulties are avoided by using a passageway 41 with a diameter very much greater than the diameter of the wires to be processed, for example, a hole 1.5 mm. in diameter for wires of a diameter less than 300μ. A leak occurs in consequence. As soon as the liquid emerges from the hole it is spread on the bottom 40 of the chamber in such a way as to reduce to a minimum the length in contact with the wire, thanks to a gaseous current which travels along a tube 44 welded along the length of a generatrix at the bottom 40 of the vessel, and which is pierced to admit the passage of the wire (as shown in FIG. 2) by two diametrically opposed holes 45 and 46 of which the former coincides with the hole 41. The tube 44 bends upwards at 47 and terminates in a mouth 48 which is preferably orientable. The gas which arrives at 49 from a source under pressure opposes the leakage of liquid through the hole 46 by carrying along with it, for later reintroduction into the chamber 39 at 48, the liquid which has escaped through the hole 41. By suitable orientation of the extremity 48 of the tube 47, it is also possible to use the gaseous current for the purpose of agitating the contents of the bath.

The gas used should normally be at the temperature of the bath and should have no harmful effect on the bath or on the wire. Indeed said gas should have no chemical effect at all on the bath or the wire, as its function must be purely a mechanical one. For this purpose the gas is chosen according to the chemical properties of the bath and the wire, and is first splash-saturated in washing bottles (one of which is shown at 50) which contain the same bath contents as the chamber so as not to modify by evaporation the composition or quantity of the bath contained in the chamber.

A drain tube 51 connected to the bottom 40 of the vessel allows for drainage of the latter.

It will be seen, then, that the processing liquid follows a circuit, part of which is at atmospheric pressure (between the exit 48 of the tube 47 and the upper surface of the liquid 42) while the rest is under higher pressure (in the tube 44, 47), this pressure being supplied by an appropriate pump (not shown) located in the inlet duct 49 of the gas.

In FIG. 1 can also be seen the conductor 52 carrying the current to the electrode 43, while the wire 23 constitutes the second electrode and is connected by, say, a mercury contact to an electrical circuit which must in any case be provided though it is not shown.

Figure 3:
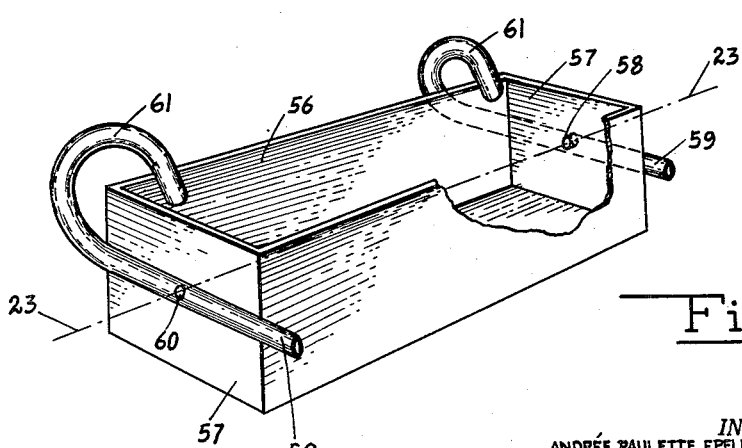
FIG. 3 is a view similar to FIG. 1 of a variant.

In the case of FIG. 3 the chamber works on the same principle as that in FIGS. 1 and 2, but here the wire 23 crosses it horizontally. The processing cell comprises a chamber 56 in the shape of a parallelepiped along whose longitudinal axis the wire 23 passes to pass through the vertical end 57 through holes 58 similar to the hole 41 in FIGS. 1 and 2. Pipes 54, pierced for the passage of the wire with diametrically opposed holes coinciding with the holes 58 in the sides 57, one of which can be seen at 60, are attached to the sides 57 and are crossed, like tube 44, by a gas under pressure. They may be bent at 61 so as to return to the chamber 56 any liquid which may have escaped through holes 58.

The apparatus shown in FIGS. 1 to 3 may, with slight modification not shown, be utilized for the processing of a strip or other elongated, ribbon-like material. In that case, the holes are in the shape of slits whose dimensions correspond to those of the strip with, however, the same ratio of surfaces as before, that is to say slits whose dimensions are at least twice those of the material to be processed. The chamber 39 may in that case have, say, a horizontal rectangular cross-section when a ribbon is to be processed, while the electrode 43 then takes the form of two parallel rectangular plates.

It has already been stated that the process according to the invention is carried out locally, and that the wire to be processed and the circuit followed by the processing liquid were displaced relative to each other, in order to effect processing of the whole of the surface. In practice, with the type of equipment described and illustrated in FIGS. 1 to 3, it may be found that the wire is passed through the processing bath several times. This operation is carried out either as a to-and-fro movement with the air of a single processing chamber, else in a continuous fashion by placing several chambers in series. In each case, the wire is washed and dried by any suitable means upon exit from the chamber, or from each chamber. A complete installation is shown diagrammatically in FIG. 8.

In FIG. 4 it will be seen that the wire to be processed 23 passes over a large-diameter drive pulley 71 and crosses the processing chamber (of type 39 in FIG. 1, for example) and circuits for washing 72, 74 and for drying 73, 75. Two weights 76 and 76a which are of very small but equal mass are attached to the extremities of the wire and are just sufficient to keep it vertical. A uniform rotational movement is imparted to pulley 71 so as to displace the wire. This movement takes place alternately in one direction and then in the other. On exit from chamber 39, the wire is washed and then dried in a continuous fashion by either one of the two pieces of equipment for washing 72, 74 and drying 73, 75 which are placed on either side of chamber 39 and which alternately come into action according to the direction in which the wire is displaced, in a manner which is described below.

Where electrolytic processing is concerned, the electric current is carried to the wire 23 by any appropriate means, for example by the pulley 71. For this purpose, the pulley is a conductor and is connected by means of a ring (not shown) mounted on its axle 77, a length of wire and a switch 79 to one terminal of a source 80, the other terminal of which is connected to the electrode 43 by the wire 52. Between each to-and-fro movement of the wire, the current may, if desired, be automatically cut off and re-established by any appropriate means not shown.

Each piece of washing equipment comprises a tube 72 or 74, preferably slightly inclined, pierced with two diametrically opposed holes 81 or 83 to allow for passage of the wire 23 fed with washing liquid (for example a solvent of the bath constituents) from a reservoir 82 or 84 under atmospheric pressure equipped with an overflow 85 and 87 which serves to fix the upper level of the liquid in the reservoir and which communicates with a master reservoir 86 via a pipe 95. Reservoirs 82 and 84 are located at a level above that of the holes 81 and 83. Pipes 72 and 74 carry the used liquid into a collector 88 which in turn leads to a drain-off if the washing liquid is not worth recuperating; otherwise, collector 88 is connected to reservoir 86 by means of a duct diagrammatically illustrated by the chain-dotted lines 89, which may embody a filter or appropriate regenerating equipment 90 and, if necessary, a circulating pump which is not shown.

Pumps 91 and 93 can draw the liquid from the reservoir 86 and pump it into reservoirs 82 and 84 via the pipes 92 and 94 respectively.

Each piece of drying equipment comprises a tube 73 or 75 similar to tubes 72 and 74 but which is of greater diameter, also pierced with diametrically opposed holes 96 or 98 for the passage of the wire 23. A gas having no chemical effect on the wire 23 is sucked from a source shown by the arrows 97 or 99 by means of pump 100 or 102 and is then heated by any appropriate means, for example by electrical resistances 101 or 103.

The installation functions as follows:

After having introduced the appropriate bath liquid into chamber 39 and placed the wire 23 in position, the pulley 71, as explained previously, is alternately rotated (in a manner to be explained later) in order to ensure that the length of wire 23 to be processed is passed through the bath the number of times required by the processing effect which is sought. After each descent of the wire 23 through the chamber 39, the processed wire is washed at 83 and dried at 98. After each ascent through chamber 39, the wire 23 is washed at 81 and dried at 96. The pieces of equipment 72 and 73 remain inactive during the descents of the wire, while the pieces fo equipment 74 and 75 are non-operative during ascents. The electrolysis current is cut off, if required, by a switch 79 on immobilisation of the pulley 71 between each displacement of the wire.

The alternate rotational movement of the pulley 71 is effected by a constant-speed electric motor 104 via an appropriate chain and sprocket or reduction-gear transmission system which is capable of rotating the pulley at the desired low speed. This transmission is diagrammatically illustrated by the chain-dotted lines 105. The motor 104 incorporates two windings 106, 107. One terminal of the winding 106 is connected by a wire 108 to a terminal of a source of current 109 whose other terminal is connected to the mobile contact of a reversing switch 110 equipped with two fixed contact points $a$ and $b$ and a neutral point $c$. A wire 111 connects the second terminal of the winding 106 to contact point $a$ of the switch 110. The winding 107 is connected to the wire 108 on the one hand and by a wire 112 to point $b$ of the switch 110, on the other.

Furthermore, the pumps 91, 93, 100 and 102 are respectively connected to electric motors 114, 116, 118 and 120 by appropriate transmission systems diagrammatically illustrated at 113, 115, 117 and 119. The heating resistance coils 101, 103 of the drying tubes 73, 75 are connected in parallel to the input circuit of the motors 118 and 120 respectively. A wire 121 links one terminal of motor 114 to wire 108, while a wire 122 joins the second terminal of this motor to the wire 112 or to the terminal $b$ of switch 110. A wire 123 connects one terminal of the motor 116 to the wire 111 or to the terminal $a$ of switch 110, while wire 121 links the other terminal of this motor to wire 108. A wire 124 links one terminal of the motor 118 to wire 108 and a wire 125 connects the other terminal of this motor to the wire 112 or to the terminal $b$ of the switch 110. Finally, a wire 126 joins one terminal of the motor 120 to the wire 108, while a wire 127 connects the other terminal of this motor to the wire 111.

It will be seen from the above that the winding 106 of the motor 104, which is coupled in parallel with the motor 116 which actuates the pump 93 and the motor 120 which operates the pump 102, is that which rotates the motor 104 in the direction corresponding to the operation of the washing circuit 74 and drying circuit 75, that is to say to the descent of wire 23 through chamber 39, and hence to the anti-clockwise rotation of pulley 71. The winding 107 which is in parallel with motors 114 and 118, on the contrary, corresponds to the opposite rotation of the pulley 71 and therefore to the ascent of the wire 23 through chamber 39. Since the motors 118, 120 and the resistance coils 101, 103 are respectively in parallel, these resistance coils are energized only when the corresponding pump is being actuated.

The manner of operation of this layout is as follows:

On placing the mobile contact of switch 110 onto terminal $a$, as shown in FIG. 4, the motor 114 (via winding 106) and motors 116 and 120 are set in motion. Pulley 71 turns in an anti-clockwise direction, wire 23 descends through chamber 39, while equipment 74 and 75 are in operation, with equipment 72 and 73 inoperative (their pump-motors being out of circuit).

When the length of wire 23 to be processed has crossed the chamber 39, the switch 110 is manipulated in order to stop the various motors by placing the mobile contact onto the neutral position $c$ shown in dashes in FIG. 4.

Should it be desired to have the wire 23 re-cross the chamber 39 in the opposite direction, which can be done immediately or subsequent to a lapse of time used, say, to measure the state of the wire after initial processing, the mobile contact of switch 110 is placed onto contact $b$. As a result, motor 104 causes pulley 71 to rotate in a clockwise direction under the impulse of winding 107, the wire 23 ascends through chamber 39, and the motors 114 and 118 actuate installations 72 and 73, while motors 116 and 120 are placed out of circuit, thus rendering installations 74 and 75 inoperative. When the wire 23 has fully crossed chamber 39, the switch 110 is used to cut off the circuit.

Naturally, if necessary, the switch 79 will have been used to open or close the electric circuit at the required moment.

In a possible variant, not illustrated, reversing of the motor 104 and actuating or stopping of motors 114, 116, 118 and 120 is automatically controlled by electrical circuits, in any manner which will be obvious to a specialist in the art.

As an example of the application of the apparatus according to the invention, mention may be made of the processing of a nickel wire having an initial diameter of 125μ which it is intended to thin down. This wire passes, in two minutes (150 cm. being displaced at 0.8 cm./sec.), through an installation of the type indicated in FIGS. 1 and 2. The contents of the processing chamber consist of a solution of magnesium perchlorate in alcohol in a proportion of 60 gr./litre. The temperature of the bath is 20° C. and its height 14 mm. A stainless steel electrode of cylindrical shape with a diameter of 65 mm. and a height of 10 mm. is used. Current density is 0.5 A./cm.² and the number of passages is 150. A wire is obtained, the diameter of which, measured with a microscope, is 8μ.

It must be clearly understood that the embodiments described and illustrated have been given by way of example only and may be subject to numerous detail modifications without departing from the spirit of the invention. In the appended claims the continuous, elongated material to be processed will be termed strip-like material.

What we claim is:

1. Apparatus for the processing of the surface of strip-like material by means of a liquid, comprising a processing chamber, at least one hole in said chamber for the free passage of said material, means for putting the processing liquid into contact with a limited area of said material at least in the vicinity of said hole, means for continuously displacing said material through said hole, a tube externally welded to said chamber and pierced with two diametrically opposed holes of which one coincides with said hole in said chamber whereas both have the same diameter as said hole, and means for introducing into said tube a gas having no harmful effect on the processing, at a speed sufficient to prevent the processing liquid from escaping from said tube through its outer hole.

2. Apparatus for electrolytical processing of strip-like material by means of a liquid, comprising a processing chamber made of insulating material, at least one hole in said chamber for the free passage of said material, means for putting the processing liquid into contact with a limited area of said material at least in the vicinity of said hole, means for continuously displacing said material through said hole, an electrode located within said processing chamber, an outer source of current, means for connecting said source both to the electrode and to the surface to be processed, a tube externally welded to said chamber and pierced with two diametrically opposed holes of which one coincides with said hole in said chamber whereas both have the same diameter as said hole, and means for introducing into said tube a gas having no harmful effect on the processing, at a speed sufficient to prevent the processing liquid from escaping from said tube through its outer hole.

3. Apparatus for the processing of the surface of strip-like material by means of a liquid, comprising a processing chamber having at least one end surface, means for causing the material to be processed to pass through said chamber in an axial direction, at least one central hole in at least one end wall of said chamber for free passage of said material, means for bringing the processing liquid into said chamber so as to surround a limited area of said strip-like material, means for continuously displacing said limited surface of the strip-like material with respect to said central hole, a tube welded to said end wall of the chamber, pierced with two diametrically opposite holes of which one coincides with the hole in said chamber whereas both have the same diameter as said chamber hole and means for introducing into said tube a gas having no harmful effect on the processing at a speed sufficient to prevent the processing liquid from escaping from said tube through its outer hole.

4. Apparatus for electrolytical processing of strip-like material by means of a liquid, comprising a processing chamber made of insulating material, at least one hole in said chamber for the free passage of said material, means for putting the processing liquid into contact with a limited area of said material at least in the vicinity of said hole, means for continuously displacing said material through said hole, a tube welded to said chamber end, pierced with two diametrically opposed holes of which one coincides with the said hole in said chamber whereas both have the same diameter as said hole, means for introducing into said tube a gas having no harmful effect on the processing at a speed sufficient to prevent the processing liquid from escaping from said tube through its outer hole, an electrode located within said processing chamber, an outer source of current, and means for connecting said source both to the electrode and to the surface to be processed.

References Cited in the file of this patent

UNITED STATES PATENTS

| | | |
|---|---|---|
| 1,068,411 | Chubb | July 29, 1913 |
| 1,114,592 | De Witt | Oct. 20, 1914 |
| 1,403,903 | Hamister | Jan. 17, 1922 |
| 2,532,907 | Hangosky | Dec. 5, 1950 |
| 2,797,193 | Eigler et al. | June 25, 1957 |
| 2,848,410 | Knuth-Winterfeldt et al. | Aug. 19, 1958 |